United States Patent

Schulz et al.

[15] 3,679,739

[45] July 25, 1972

[54] PRODUCTION OF ESTERS OF ACETIC ACID

[72] Inventors: Gerhard Schulz; Guenther Matthias, both of Ludwigshafen, Germany

[73] Assignee: Badische Anilin- & Soda-Fabrik Aktiengesellschaft, Ludwigshafen/Rhein, Germany

[22] Filed: June 13, 1969

[21] Appl. No.: 833,178

[30] Foreign Application Priority Data

June 21, 1968 Germany......................P 17 68 708.0

[52] U.S. Cl. .....................260/488 F, 260/234 R, 260/465.4, 260/469, 260/476 R, 260/479 R, 260/488 CD, 260/488 J, 260/488 R, 260/496, 260/489
[51] Int. Cl........................................C07c 67/00, C07c 69/14
[58] Field of Search...................268/488 F, 488 J, 476, 496, 268/469, 489, 465.4, 234 R, 479 R

[56] References Cited

UNITED STATES PATENTS

| 1,990,483 | 2/1935 | Graves | 260/488 |
|---|---|---|---|
| 2,007,968 | 7/1935 | Graves | 260/488 |
| 2,018,759 | 10/1935 | Frohlich et al. | 260/488 |

Primary Examiner—Lorraine A. Weinberger
Assistant Examiner—Vivian Garner
Attorney—Johnston, Root, O'Keeffe, Keil, Thompson & Shurtleff

[57] ABSTRACT

Production of esters of acetic acid by reaction of ketenes with alcohols in the presence of metal sulfides. The products are valuable intermediates, for example for adhesives and photographic film, and some of them are important solvents, for example for surface coatings.

10 Claims, No Drawings

PRODUCTION OF ESTERS OF ACETIC ACID

The invention relates to the production of esters of acetic acid by reaction of ketenes with alcohols in the presence of metal sulfides.

It is known that many acylations of compounds containing hydroxyl groups with ketenes which are very difficult to carry out or impossible without catalysts give better yields when catalysts are used. Especially acylations of polyhydric and higher alcohols proceed incompletely because the acylation product inhibits the further reaction. Similarly the reaction of tertiary alcohols or phenols gives poor yields of end product in the absence of catalysts (Angewandte Chemie, 68, 361–363 (1956). Mainly Lewis acids such as sulfuric acid, p-toluenesulfonic acid, phosphoric acid, boron trifluoride, boron trifluoride etherate and potassium hydrogen sulfate are used as catalysts. Since however these are strong acids or, as in the case of boron trifluoride, yield strongly acid secondary products in the presence of traces of water, they may cause corrosion in metallic apparatus. Moreover the acid catalysts in many cases cause the formation of resinous products (The Journal of General Chemistry Of the U.S.S.R., 21, 1147 (1951)). In some cases the alcohols used are dehydrated (Dolgow, die Katalyse in der organischen Chemie; VEB Deutscher Verlag der Wissenschaften, Berlin, 1963).

Another disadvantage of these catalysts is that the esters formed can only be completely separated from the catalysts by distillation. Basic catalysts, such as urea, tertiary amines and salts of acetic acid (whose use for the acetylation of compounds containing hydroxyl groups with ketene is described in Angewandte Chemie, 68, 563 (1956)) exhibit the same disadvantage. Moreover tertiary amines promote secondary reactions, for example formation of diketene and polymerizations (Uspechi Chimii, 25, 1351 (1956)).

It is also known that alcohols can be acetylated with ketene in the presence of an ion exchanger containing sulfonic acid groups (Japanese Pat. Application No. 8334/65). Ion exchangers also have the disadvantage however that they are partially dissolved by the starting materials and make working up of the reaction mixture, for example by distillation, more difficult.

Similar difficulties, for example corrosion problems, may arise also when using metal halides, for example zinc chloride (Angewandte Chemie, loc. cit.). Depending on the constitution of the alcohol used, they may also be dissolved by these starting materials for example and/or may promote isomerization or dehydration of the alcohol (Houben-Weyl, "Methoden der organischen Chemie", volume 4/2, page 214).

It is an object of this invention to provide a new process for the production of esters of acetic acid which is easy to carry out and gives good yields of high-purity product.

This and other objects are achieved in the reaction of ketenes with alcohols in the presence of a catalyst by carrying out the reaction in the presence of sulfides of metals of subgroups 1, 2, 6 and 8 or main group 4 of the Periodic System and/or bismuth sulfide.

As compared with the prior art, the process according to the invention gives a large number of esters of acetic acid in a simple way and in many cases in better yields and with higher purity. The abovementioned difficulties, for example resinification and polymerization of the reactants, dehydration and isomerization of the alcohols and corrosion problems do not occur or they occur to a lesser extent. The catalysts according to the invention are insoluble in the end products so that the end compounds can be separated from the catalysts in a simple way, for example by decantation of filtration. These advantageous results are surprising because the said metal sulfides do not have the acid or basic properties to which the catalytic activity of esterification catalysts is usually attributed It is also known of many reactions that metal sulfides have the effect of inhibiting catalytic activity or preventing reaction (catalyst poisons) so that it could not be foreseen that it would be possible to carry out the process according to the invention so well.

Ketene devoid of substituents or ketenes which bear substituents (aldoketenes or ketoketenes) may be used as starting materials. The starting ketene may be prepared in the conventional way by thermal cleavage of suitable compounds such as acetone or glacial acetic acid. The ketene obtained is generally used without further purification. The avoid secondary reactions, for example the formation of diketene, it may be advantageous to dilute the ketene with an inert gas such as nitrogen or carbon monoxide. For example a gas mixture containing from 0.1 to 100 vol.% of ketene may be used. Preferred ketenes are those having the general formula:

where $R^1$ and $R^2$ may be identical or different and each denotes an alkyl radical having from one to seven carbon atoms or an aryl radical having from six to 10 carbon atoms or particularly a hydrogen atom. For example the following ketenes are suitable: ketene, dimethylketene, diethylketene, methylphenylketene, diphenylketene and naphthylphenylketene. The higher ketenes may be metered in in the gas or liquid phase.

Aromatic and particularly saturated and unsaturated aliphatic, cycloaliphatic and araliphatic alcohols may be used as the alcohols in the process according to this invention. Suitable alcohols generally contain from one to 20 particularly from one to seven, carbon atoms and may bear substituents which are inert under the reaction conditions, for example alkoxy groups having up to six carbon atoms, cyano groups or halogen atoms, for example chlorine or bromine atoms. They may be monohydric or polyhydric and may contain primary and/or secondary and/or tertiary hydroxyl groups. Polyhydric alcohols give polyacetic acid esters in the reaction or, when higher ketene homologs are used, the esters of the corresponding acids. Monohydric alcohols are preferred.

Compounds of the benzene or naphthalene series which have one or two hydroxyl groups and may also contain inert substituents such as chlorine atoms, bromine atoms, alkoxy groups, aroxy groups, alkyl groups or ary groups, for example having in each case up to 10, particularly up to six, carbon atoms may be advantageously used as aromatic alcohols.

Aliphatic, cycloaliphatic or araliphatic ketones which bear at least one hydrogen atom on a carbon atom adjacent to the carbonyl group and which are enolizable under the reaction conditions are also suitable for the process according to this invention. Suitable ketones generally contain from three to 12, particularly from three to seven, carbon atoms. They may bear, as substituents, groups and/or atoms which are inert under the reaction conditions, for example those specified above.

Examples of alcohols to be used for the process according to this invention are: ethyl alcohol, isobutyl alcohol, tertiary-butanol, amyl alcohol, n-decyl alcohol, cetyl alcohol, methyl glycol, ethyl glycol, n-butyl glycol, cyclohexanol, capryl alcohol, 1-ethoxy-1-butanol, -methoxy- -methylphenylethyl alcohol, linalool, nerolidol, pinacol, benzopinacol, benzyl alcohol, glucose, fructose and other monosaccharides or polysaccharides, allyl alcohol, β-phenylethyl alcohol, cyanohydrin, 1,3-propylene glycol, glycerol; p-chlorophenol, m-hydroxydiphenyl, β-napthol; ethylene glycol monomethyl ether, ethylene glycol monoethyl ether, 1,3-propylene glycol monobutyl ether, acetone, mesityl oxide, acetophenone, diisobutyl ketone, methyl ethyl ketone, cyclohexanone, methyl benzyl ketone, methyl amyl ketone and chloroacetone.

The alcohol is generally reacted with the ketene in an equivalent ratio of 1:1. In the case of compounds which are difficult to acetylate it may be advantageous however to use an excess of ketene, for example up to five times the stoichiometric amount, the excess ketene escaping being used if desired for further reactions.

The reaction is carried out in the presence of a sulfide of a metal of subgroup 1, 2, 6 or 8, main group 4, bismuth sulfide or mixtures of these sulfides.

The catalysts may be used as such or on inert carrier material. The weight ratio of catalyst to carrier may vary within wide limits. It is advantageous to choose a ratio of catalyst to carrier of 5–50:50–95% by weight. Generally however sulfides are used as such. Examples of suitable catalysts are the sulfides of cadmium, copper, lead, nickel, molybdenum, cobalt, bismuth, zinc and tin. The catalyst is generally used in an amount of 1 to 500%, particularly from 1 to 300%, by weight with reference to the alcohol. The metal sulfides may be prepared by conventional methods, for example by reaction of metal chlorides with hydrogen sulfide in acid or neutral solution, washing the precipitated sulfide with hot water and drying it, and used in any form, for example as powder, in compressed form as tablets or spheres, with or without carrier material.

The reaction is carried out as a rule at a temperature of from 0° to 100° C in batches or continuously and generally at atmospheric pressure. It may be carried out at subatmospheric pressure, for example at 50 mm, for example in the case of compounds which are difficult to acetylate or to prevent formation of diketene. In the case of compounds which are easy to acetylate, it may be advantageous to use superatmospheric pressure, for example of up to 5 atmospheres.

If the starting materials and the end products are liquid under the reaction conditions, it is preferred not to use a solvent in the process according to this invention. When solid starting material are used or when the end products are solids, it is advantageous to add a solvent which is inert under the reaction conditions.

Examples of suitable solvents are organic liquids such as ethers, nitriles, esters and aromatic or aliphatic hydrocarbons which may be nitrated or halogenated. Specific examples are tetrahydrofuran, dioxane, diethylene glycol dimethyl ether, acetonitrile, ethyl acetate, benzene, xylene, chlorobenzene, nitrobenzene, ligroin, nitromethane and tetrachloroethane. It is preferred to use a solvent whose boiling point differs appreciably from that of the end product. Solutions of starting materials containing hydroxyl groups in the end product may also be used for the process according to the invention.

The reaction may be carried out as follows: ketene with or without an inert gas such as nitrogen or carbon monoxide is passed into an elongated reactor, for example a distillation column which is filled with a mixture of the alcohol with or without a solvent and the catalyst. During the supply of ketene, for example in the course of 30 minutes to 10 hours, the reaction mixture is kept at the reaction temperature while being well stirred. Dissolved ketene is then expelled from the mixture by passing in nitrogen. The end product can be separated from the reaction mixture by conventional methods, for example by filtering off the catalyst and fractionally distilling the filtrate. The reaction may also be carried out continuously, for example by mixing together ketene and alcohol in cocurrent or countercurrent, with or without a solvent, in a packed column filled with catalyst.

The compounds obtained by the process according to the invention are valuable intermediates, for example for adhesives and photographic film, and some of them are important solvents, for example for surface coatings. As regard their use, reference is made to the said publications and Ullmanns Encyklopadie der technischen Chemie, volume 6, pages 795 et. seq.

The invention is illustrated by the following Examples.

The parts specified in the Examples are parts by weight.

Example 1

90 parts of ethylene glycol monoethyl ether and 5 parts of powdered tin (II) sulfide are fed into a cylindrical reaction tube having a diameter of 17 mm and having a superposed reflux cooler and a sieve as the base plate. 76 parts of ketene is then passed in at the bottom of the tube at 50°C in the course of two hours. 79.6% by volume of inert gas consisting of carbon monoxide with traces of methane and ethylene is mixed with the ketene (partial pressure of the ketene 0.204 atmosphere). Dissolved ketene is then expelled from the reaction mixture at 50° C by passing nitrogen through. The catalyst is filtered off. 131 parts of reaction mixture remains. 131 parts (99.2% of the theory with reference to alcohol used) of ethylene glycol acetate monoethyl ether is obtained by distillation. It has a boiling point of 156° C.

A polymerized residue of 0.07% by weight of the ester remains.

Example 2

75 parts of ketene is passed in under a partial pressure of 0.194 atmosphere analogously to Example 1 but without catalyst. 76 parts of ester is obtained, i. e. a yield of 58% of the theory. 0.30% by weight of polymerized residue is obtained.

Example 3

In a reaction carried out analogously to Example 1 but with 5 parts of tin (II) oxide as catalyst, 70 parts of ketene is introduced under a partial pressure of 0.23 atmosphere. 97 parts of ester is obtained, i. e. a yield of 74% of the theory. 1% of the product is polymerized residue.

Other Examples carried out analogously to Example 1 are contained in the following Table in which the following abbreviations are used:

A = ethylene glycol monoethyl ether;
B = cyclohexanol;
C = sec-butanol;
D = tert-butanol;
E = ethylene glycol monomethyl ether;
Ex = Example;
Ps = parts of substrate;
S = substrate;
Cat = catalyst;
PPK = partial pressure of ketene in atm;
AKP = amount of ketene introduced in parts;
DM = duration in minutes;
Y% = yield of ester in % of the theory.

TABLE

| Ex | PS | S | Cat | PPK | AKP | DM | Parts | Y% |
|---|---|---|---|---|---|---|---|---|
| 4 | 76 | E | CdS | 0.16 | 56.5 | 120 | 115.5 | 98 |
| 5 | 90 | A | Cu$_2$S | 0.21 | 74.3 | 120 | 130.8 | 99 |
| 6 | 76 | E | PbS | 0.20 | 78.5 | 120 | 117 | 99 |
| 7 | 76 | E | NiS | 0.17 | 65.0 | 120 | 92 | 78 |
| 8 | 45 | A | MoS$_3$ | 0.19 | 26.2 | 120 | 65.52 | 99 |
| 9 | 100 | B | none | 0.15 | 42.9 | 120 | 85.0 | 60 |
| 10 | 100 | B | CoS | 0.16 | 67.5 | 120 | 109.2 | 77 |
| 11 | 74 | C | none | 0.19 | 73.0 | 120 | 63.7 | 55 |
| 12 | 74 | C | Bi$_2$S$_3$ | 0.18 | 72.6 | 120 | 88.0 | 76 |
| 13 | 74 | D | none | 0.16 | 58.4 | 120 | 42.9 | 37 |
| 14 | 74 | D | ZnS | 0.17 | 63.8 | 120 | 63.7 | 55 |
| 15 | 76 | E | none | 0.20 | 57.1 | 140 | 74.2 | 64 |
| 16 | 76 | E | ZnS | 0.24 | 76.4 | 120 | 114.4 | 97 |

We claim:

1. In a process for the production of esters of acetic acid by reaction of a ketene with an aliphatic, cycloaliphatic or araliphatic alcohol in the presence of a catalyst, the improvement which comprises carrying out the reaction in the presence of a sulfide of at least one metal selected from the group consisting of cadmium, copper, lead, nickel, molybdenum, cobalt, bismuth, zinc and tin as the catalyst at a temperature of about 0° to 100° C.

2. A process as claimed in claim 1 wherein the reaction is carried out with a gas mixture containing from 0.1 to 100% by volume of ketene.

3. A process as claimed in claim 1 wherein the reaction is carried out with an alcohol which is an aliphatic, cycloaliphatic or araliphatic ketone bearing at least one hydrogen atom on at least one of the carbon atoms adjacent to the carbonyl group, said ketone having been enolized under the reaction conditions.

4. A process as claimed in claim 1 wherein the reaction is carried out with an excess of ketene of up to five times the stoichiometric amount.

5. A process as claimed in claim 1 wherein the reaction is carried out with the catalyst in the amount of from 1 to 500% by weight with reference to the alcohol.

6. A process as claimed in claim 1 wherein the reaction is carried out with the catalyst in an amount of from 1 to 300% by weight with reference to alcohol.

7. A process as claimed in claim 1 carried out in presence of an inert solvent.

8. A process as claimed in claim 1 wherein said ketene has the formula

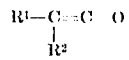

in which $R^1$ and $R^2$ represent hydrogen, alkyl of one to seven carbon atoms or aryl of six to 10 carbon atoms.

9. A process as claimed in claim 2 8 wherein said alcohol is a monohydric alcohol.

10. A process as claimed in claim 9 wherein said ketene has the formula $CH_2 = C = O$.

* * * * *

PO-1050
(5/69)

UNITED STATES PATENT OFFICE
CERTIFICATE OF CORRECTION

Patent No. 3,679,739          Dated July 25, 1972

Inventor(s)      Schulz et al

It is certified that error appears in the above-identified patent and that said Letters Patent are hereby corrected as shown below:

Column 3, line 27, reads " material", should read --- materials

Column 3, line 70, reads "... 17 mm. ...", should read -- 27 mm.

Column 6, line 4, reads "... claim 28 ...", should read ----- ... claim 8 ... -----

Signed and sealed this 9th day of January 1973.

(SEAL)
Attest:

EDWARD M. FLETCHER, JR.          ROBERT GOTTSCHALK
Attesting Officer                 Commissioner of Patents